Nov. 14, 1967 P. ALTENBURGER 3,352,000

METHOD OF ASSEMBLY OF RESONATOR

Filed Sept. 3, 1965 2 Sheets-Sheet 1

INVENTOR.
PAUL ALTENBURGER
BY
Davis, Hoxie, Faithfull & Hapgood
ATTORNEYS.

Nov. 14, 1967   P. ALTENBURGER   3,352,000
METHOD OF ASSEMBLY OF RESONATOR
Filed Sept. 3, 1965   2 Sheets-Sheet 2

INVENTOR.
PAUL ALTENBURGER
BY
Davis, Hoxie, Faithfull & Hapgood
ATTORNEYS.

United States Patent Office 3,352,000
Patented Nov. 14, 1967

3,352,000
METHOD OF ASSEMBLY OF RESONATOR
Paul Aitenburger, Besancon, France, assignor to The United States Time Corporation, Waterbury, Conn., a corporation of Connecticut
Filed Sept. 3, 1965, Ser. No. 484,810
5 Claims. (Cl. 29—177)

ABSTRACT OF THE DISCLOSURE

This invention is of a method of assembling an oscillator. The oscillator includes a base plate, a flat spring and a resonator carried by the spring. An end of the spring is inserted and fastened in a slot in a cylindrical-shaped button. The cylindrical button is inserted and fastened in holes coaxially formed in the base and resonator. The button is then cut between the base plate and the resonator, freeing the resonator to oscillate.

---

The present invention relates to timekeeping devices, and more particularly to a method of assembling the mechanical vibratory unit in an electronic timepiece.

The mechanical vibratory unit described in U.S. Patent No. 2,939,971 to Holt, Jr., may be applied to an electronic watch. In the Holt patent two annular vibrating elements are secured to a hub by radial flat springs and are driven simultaneously in opposite rotational direction about a common axis. The assembly, when excited, is a source of low frequency energy at constant frequency. It is relatively insensitive to shock and vibration and, by proper choice of materials, can be made insensitive to temperature changes.

In one application of the Holt invention to an electronic timepiece, the vibrating elements are co-axial discs (resonators) axially separated by a base plate. The discs are secured to the ends of three folded flat springs, radially arranged 120° apart. The bases of the flat springs are secured to the base plate. Owing to the high frequency of vibration the joints between the springs and the discs are under great cumulative stress. A loose joint will destroy the frequency stability of the vibratory unit.

The objectives of the present invention are to provide a method of assembly of the several members composing the vibratory unit which is simple, economical and does not distort the geometry or create stresses in the springs, and which provides a strong unitary assembly.

In accordance with the present invention, a method is provided whereby the movable portions of each folded flat spring are first attached to a single rigid member. The vibratory freedom is thereby temporarily destroyed, and the resulting rigid integral part is easily joined to the resonators and base plate. Finally, the rigid member is separated into three sections by cutting to restore vibratory freedom to the springs, and thus, to the resonator structure.

To accomplish the foregoing general objects, and other more specific objects which will hereinafter appear, my invention resides in the method steps and apparatus elements, and their relation one to another as are hereinafter more particularly described in the following detailed description of a preferred embodiment of the invention, by drawings, in which- FIG. 1 is a general cutaway view of the spring-resonator assembly.

Figure 1:
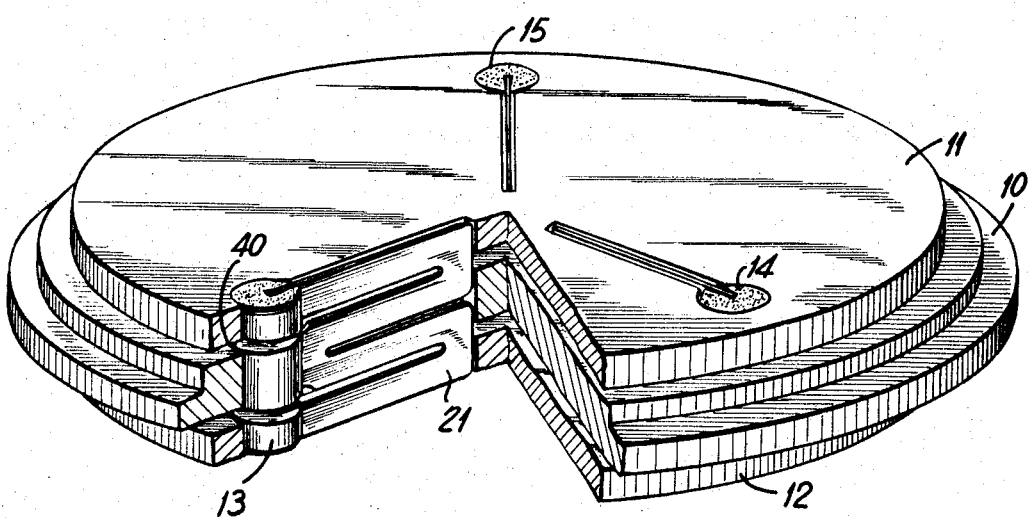
Figure 2:
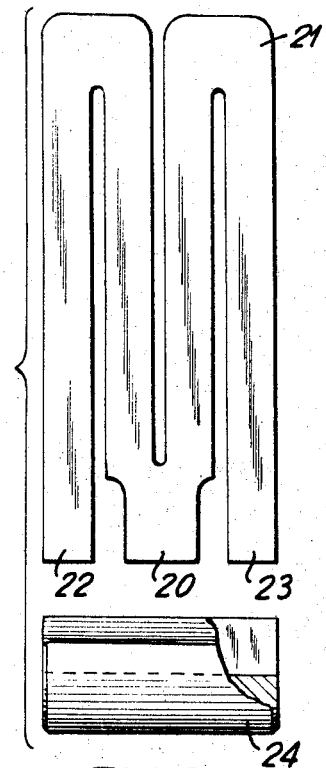
FIG. 2 is a side view of the folded flat spring and the button before they have been joined.
Figure 3:
FIG. 3 is an end view of the spring and the button after they have been joined.

As shown in FIG. 2, the end comprising the base 20 of the folded flat spring 21, and the ends of the springs 22, 23 are secured to a cylindrical member 24 called a "button." According to one embodiment they are inserted in a slot 25 which lies in a plane defined by the axis and a radius of the button, and having a width slightly in excess of the thickness of the flat spring. The depth of the slot is a matter of preference. The button itself has a length approximating the distance from the outside of one spring across the base, to the outside of the other spring. The diameter of the button is a matter of preference. The button may be made of brass, but any similar material, preferably non-ferrous, could be used. It is not necessary that the button be cylindrical. It need only be of a shape with sufficient strength to be slotted, and which can be securely attached to the resonator and base plates.

The button is swaged or staked near its slotted opening so that the opening presses on the base and ends of the folded flat spring. After the staking operation is completed, the button and the spring are secured by soldering or brazing along the sides and bottom of the slot. Silver solder has been found satisfactory when a brass button is used. Although not essential to the invention, it has been found desirable to etch chemically the base and ends of the spring so they will more readily adhere to the silver solder and to the brass button.

Figure 4:
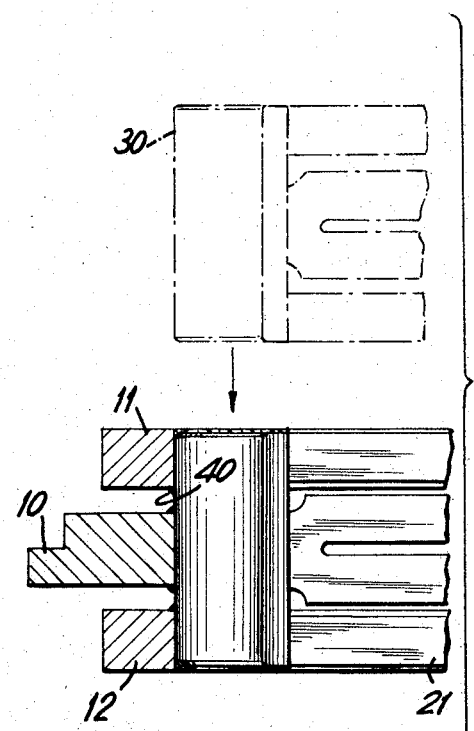
FIG. 4 is a side view of the spring-button assembly shown before and after insertion into the resonator and base plate structure.
Figure 5:
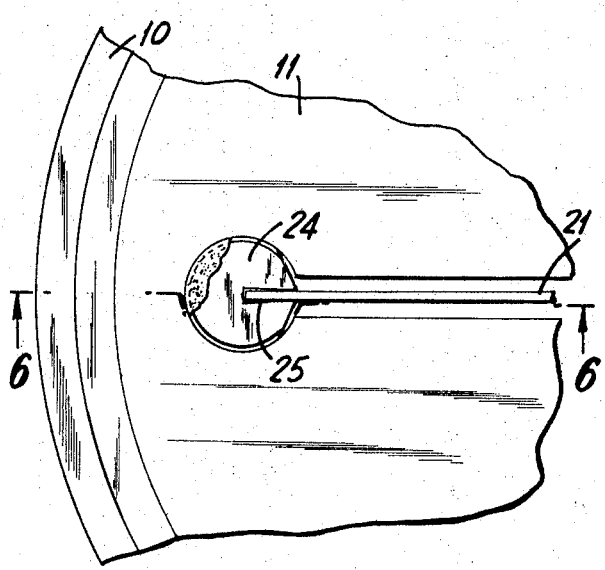
FIG. 5 is a top view of the spring-button assembly after insertion into the resonator and base plate structure.

FIG. 4 shows the flat spring and button assembly 30 positioned above the resonators 11, 12 and base plate 10, and positioned in place in the holes in the resonators and base plate. The button, once positioned as shown, is press-fitted in the resonators and in the plate. To assure a solid joint some epoxy glue 40 is added around the circumference of the button in those places where the button contacts the resonators and the base plate.

Figure 6:
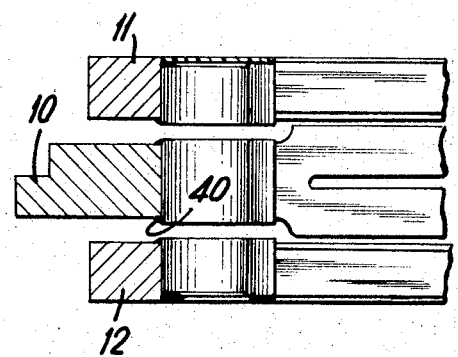
FIG. 6 is a side view taken along section 6—6 of the final assembly after the saw cuts have been made through the button.

The final step of assembly is shown in FIG. 6. Two saw cuts are made to separate the button into three members. The resonators are now attached to the base plate by the folded flat springs and are free to vibrate.

Other embodiments of the invention may depart substantially from the structure shown. The invention is not limited to a particular shape of the rigid member, nor to a particular orientation of the spring and rigid member, nor to a particular technique for making the spring adhere to the rigid member. For example, instead of using a slotted button, the spring may be attached to the outside surface of the button. It is possible to construct a unitary spring-button structure without departing from the invention. For example, the "spring" could be assembled in the resonator structure as a solid sheet, before the cuts have been made between base 20 and ends 22 and 23 to give the spring its initial vibratory properties. Furthermore, where a separate rigid member is used, screws, rivets, welding, brazing, and force-fitting may be used as well as soldering and cementing.

I claim:

1. The method of assembling the base and an end of a flat spring to resonators and a base plate comprising (in order) the steps of
    (1) longitudinally slotting a button,
    (2) inserting the base and end of the flat spring to be assembled in said slot and securing it in the slot,
    (3) longitudinally inserting and securing the said button into recesses co-axially formed in the resonator and base plate, and
    (4) transversely cutting the button between the resonator and base plate to separate completely the portions of the button to which the end and the base of the spring are attached.

2. The method of claim 1 wherein the end and base of a spring are secured by swaging and soldering.

3. The method of claim 1 wherein the button is secured into the recesses by force-fitting.

4. The method of claim 1 wherein the button is secured into the recesses by cementing.

5. The method of assembling a flat spring having a base and an end, a resonator and a base plate, by
 (a) securing the end and base of the flat spring to a button, such that one portion of the button is adjacent to the base of the spring and one portion is adjacent to a spring end,
 (b) securing the button to the base plate and a resonator, such that the portion of the button adjacent to the base of the spring is adjacent to the base plate and such that the portion of the button adjacent to the end of the spring is adjacent to the resonator, and
 (c) cutting the button to sever the said respective portions of the button.

References Cited
UNITED STATES PATENTS

| | | | |
|---|---|---|---|
| 1,864,929 | 6/1932 | Peterson | 29—44 |
| 2,210,993 | 8/1940 | Weatherhead | 29—481 |
| 2,841,864 | 7/1958 | Kelly | 29—418 |
| 2,936,519 | 5/1960 | Blackman | 29—418 |
| 2,939,971 | 7/1960 | Holt | 310—325 X |
| 3,113,463 | 12/1963 | Holt | 310—25 X |

CHARLIE T. MOON, *Primary Examiner.*

THOMAS H. EAGER, *Examiner.*